US012718274B2

(12) United States Patent
Manchanda et al.

(10) Patent No.: US 12,718,274 B2
(45) **Date of Patent: *Aug. 25, 2026**

(54) METHODS AND COMPUTER-READABLE MEDIA FOR DOMAIN-ADAPTIVE CONTENT SUGGESTION FOR AN ONLINE CONCIERGE SYSTEM

(71) Applicant: Maplebear Inc., San Francisco, CA (US)

(72) Inventors: Saurav Manchanda, Seattle, WA (US); Ramasubramanian Balasubramanian, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,084

(22) Filed: Nov. 6, 2023

(65) Prior Publication Data

US 2024/0070739 A1 Feb. 29, 2024

Related U.S. Application Data

(63) Continuation of application No. 17/550,960, filed on Dec. 14, 2021, now Pat. No. 11,847,676.

(51) Int. Cl.
*G06Q 30/00* (2023.01)
*G06Q 30/0282* (2023.01)
*G06Q 30/0601* (2023.01)

(52) U.S. Cl.
CPC ..... *G06Q 30/0619* (2013.01); *G06Q 30/0282* (2013.01); *G06Q 30/0641* (2013.01)

(58) Field of Classification Search
CPC ..... G06Q 30/0601–0645; G06Q 30/08; G06Q 30/0282

(Continued)

(56) References Cited

U.S. PATENT DOCUMENTS 9,886,517 B2 * 2/2018 Chen .................... G06F 16/958
10,706,450 B1 7/2020 Tavernier (Continued)

OTHER PUBLICATIONS

Xue et al., Improving Domain-Adapted Sentiment Classification by Deep Adversarial Mutual Learning, 2020, The Thirty-Fourth AAAI Conference on Artificial Intelligence (AAAI-20), accessed at [https://cdn.aaai.org/ojs/6477/6477-13-9702-1-10-20200517.pdf] (Year: 2020).*

(Continued)

*Primary Examiner* — Jeffrey A. Smith
*Assistant Examiner* — Lindsey B Smith
(74) *Attorney, Agent, or Firm* — Fenwick & West LLP

(57) ABSTRACT

An online concierge system uses a domain-adaptive suggestion module to score products that may be presented to a user as suggestions in response to a user's search query. The domain-adaptive suggestion module receives data that is relevant to scoring products as suggestions in response to a search query. The domain-adaptive suggestion module uses one or more domain-neutral representation models to generate a domain-neutral representation of the received data. The domain-neutral representation is a featurized representation of the received data that can be used by machine-learning models in the search domain or the suggestion domain. The domain-adaptive suggestion module then scores products by applying one or more machine-learning models to domain-neutral representations generated based on those products. By using domain-neutral representations, the domain-adaptive suggestion module can be trained based on training examples from a similar prediction task in a different domain.

20 Claims, 9 Drawing Sheets

(58) Field of Classification Search
USPC .................................................. 705/26.1–27.2
See application file for complete search history.

(56) References Cited

U.S. PATENT DOCUMENTS

| | | | | |
|---|---|---|---|---|
| 2016/0140125 | A1* | 5/2016 | Goyal | G06F 16/90324 707/751 |
| 2019/0340256 | A1* | 11/2019 | Kulkarni | G06F 16/24578 |
| 2020/0285888 | A1* | 9/2020 | Borar | G06V 10/454 |
| 2022/0172040 | A1* | 6/2022 | Kazi | G06N 3/08 |

OTHER PUBLICATIONS

Williams, R. et al. "A Learning Algorithm for Continually Running Fully Recurrent Neural Networks," *Neural Computation*, vol. 1, No. 2, Jun. 1, 1989, 10 pages.
United States Office Action, U.S. Appl. No. 17/550,960, filed Jul. 10, 2023, 18 pages.

* cited by examiner

METHODS AND COMPUTER-READABLE MEDIA FOR DOMAIN-ADAPTIVE CONTENT SUGGESTION FOR AN ONLINE CONCIERGE SYSTEM

CROSS REFERENCE TO RELATED APPLICATIONS

This application is a continuation of co-pending U.S. application Ser. No. 17/550,960, filed Dec. 14, 2021, which is incorporated by reference in its entirety.

BACKGROUND

Machine-learning models, such as neural networks, are trained based on training data. Training data that is used for a machine-learning model is generally in the same domain as the problem that the machine-learning model is solving. For example, a machine-learning model that generates search results generally must be trained based on search logs that describe how users have interacted with search results in the past. However, when a model is used to generate output for a new vertical of an online system, the model generally struggles to generate optimal output because of a lack of training data. For example, a machine-learning model that is trained to provide content suggestions alongside search results that are responsive to a search query may have less training data than the model that provides search results because users may be more inclined to interact with search results than content suggestions. Thus, a content suggestion model may be less well trained than a machine-learning model presenting search results.

Conventionally, training data in one domain cannot be simply reused for a machine-learning model in another domain, even if those domains are very similar. That is because the training data in one domain may be optimized for a different result from that of another domain. Thus, conventional training techniques for machine-learning models used for new verticals fail to provide sufficient training data for those models.

SUMMARY

An online concierge system uses a domain-adaptive suggestion module to score products that may be presented to a user as suggestions in response to a user's search query. The domain-adaptive suggestion module receives data that is relevant to scoring products as suggestions in response to a search query. The data may include user data describing the user who submitted the search query, search query data describing the user's search query, and product data describing products that are to be scored by the domain-adaptive suggestion module.

The domain-adaptive suggestion module uses one or more domain-neutral representation models to generate a domain-neutral representation of the received data. The domain-neutral representation is a featurized representation of the received data that can be used by machine-learning models in the search domain or the suggestion domain. The domain-adaptive suggestion module then scores products by applying one or more machine-leaning models to domain-neutral representations generated based on those products.

The domain-adaptive suggestion module is trained based on search examples and suggestion examples. Search examples are training examples in the search domain, and suggestion examples are training examples in the suggestion domain. The domain-adaptive suggestion module avoids bias based on the search examples by using a domain-neutrality scoring module during the training process. The domain-neutrality scoring module scores the domain neutrality of domain-neutral representations generated based on search examples and suggestion examples. The domain-neutrality scoring module may score domain-neutral representations as being more domain-neutral if the domain-neutrality scoring module cannot determine whether the domain-neutral representation was generated based on a search example or a suggestion example.

When training based on suggestion examples, the domain-adaptive suggestion module trains the one or more domain-neutral representation models based on the domain-neutrality score and based on the scores for products generated by suggestion models and search models. In some embodiments, the domain-neutral representation models are trained based on a suggestion relevance loss function, a search relevance loss function, and a domain-adaptive loss function.

By using domain-neutral representations in the scoring of products for suggestions, the domain-adaptive suggestion module can be trained based on training examples from a similar prediction task in a different domain from the problem that the domain-adaptive suggestion module is solving. More specifically, the domain-adaptive suggestion module can be trained based on search examples without biasing towards features that work for search scoring but not for suggestion scoring. Thus, the domain-adaptive suggestion module can be trained based on more training data, and can therefore be more effective in scoring products for presentation to users as suggestions.

DETAILED DESCRIPTION

Environment of an Online Concierge System

Figure 1:
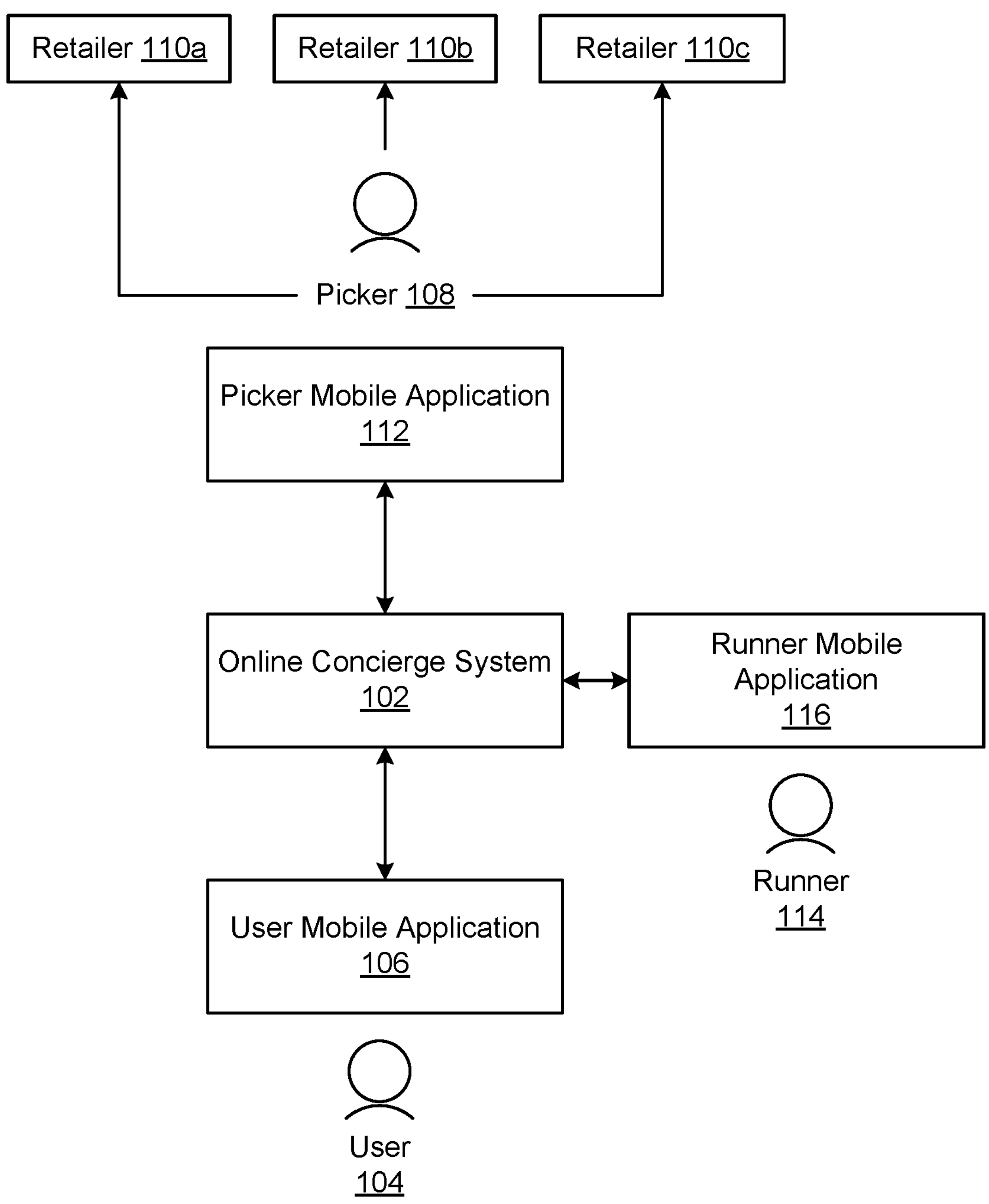
FIG. 1 illustrates the environment of an online concierge system, in accordance with some embodiments.

FIG. 1 illustrates an example system environment 100 of an online concierge system 102, according to some embodiments. The system environment 100 illustrated in FIG. 1 includes an online concierge system 102, a user 104, a user mobile application 106, a picker 108, one or more retailers 110, a picker mobile application 112, a runner 114 and a runner mobile application 116. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Additionally, the figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The online concierge system 102 is configured to receive orders from one or more users 104 (only one is shown for the sake of simplicity). An order specifies a list of goods or products to be delivered to the user 104. Goods, items, and products may be used synonymously herein to mean any item that a user 104 can purchase via the online concierge system. The order also specifies the location to which the goods are to be delivered, and a time window during which the goods should be delivered. In some embodiments, the order specifies one or more retailers from which the selected items should be purchased. The user may use a user mobile application (UMA) 106 to place the order; the UMA 106 is configured to communicate with the online concierge system 102.

The online concierge system 102 is configured to transmit orders received from users 104 to one or more pickers 108. A picker 108 may be a contractor, employee, or other person (or entity) who is enabled to fulfill orders received by the online concierge system 102. The environment 100 also includes three retailers 110*a*, 110*b*, and 110*c* (only three are shown for the sake of simplicity; the environment could include any number of retailers). The retailers 110 may be physical retailers, such as grocery stores, discount stores, department stores, etc., or non-public warehouses storing items that can be collected and delivered to users. Each picker 108 fulfills an order received from the online concierge system 102 at one or more retailers 110, delivers the order to the user 104, or performs both fulfillment and delivery. In some embodiments, pickers 108 make use of a picker mobile application 112 which is configured to interact with the online concierge system 102.

Online Concierge System

Figure 2:
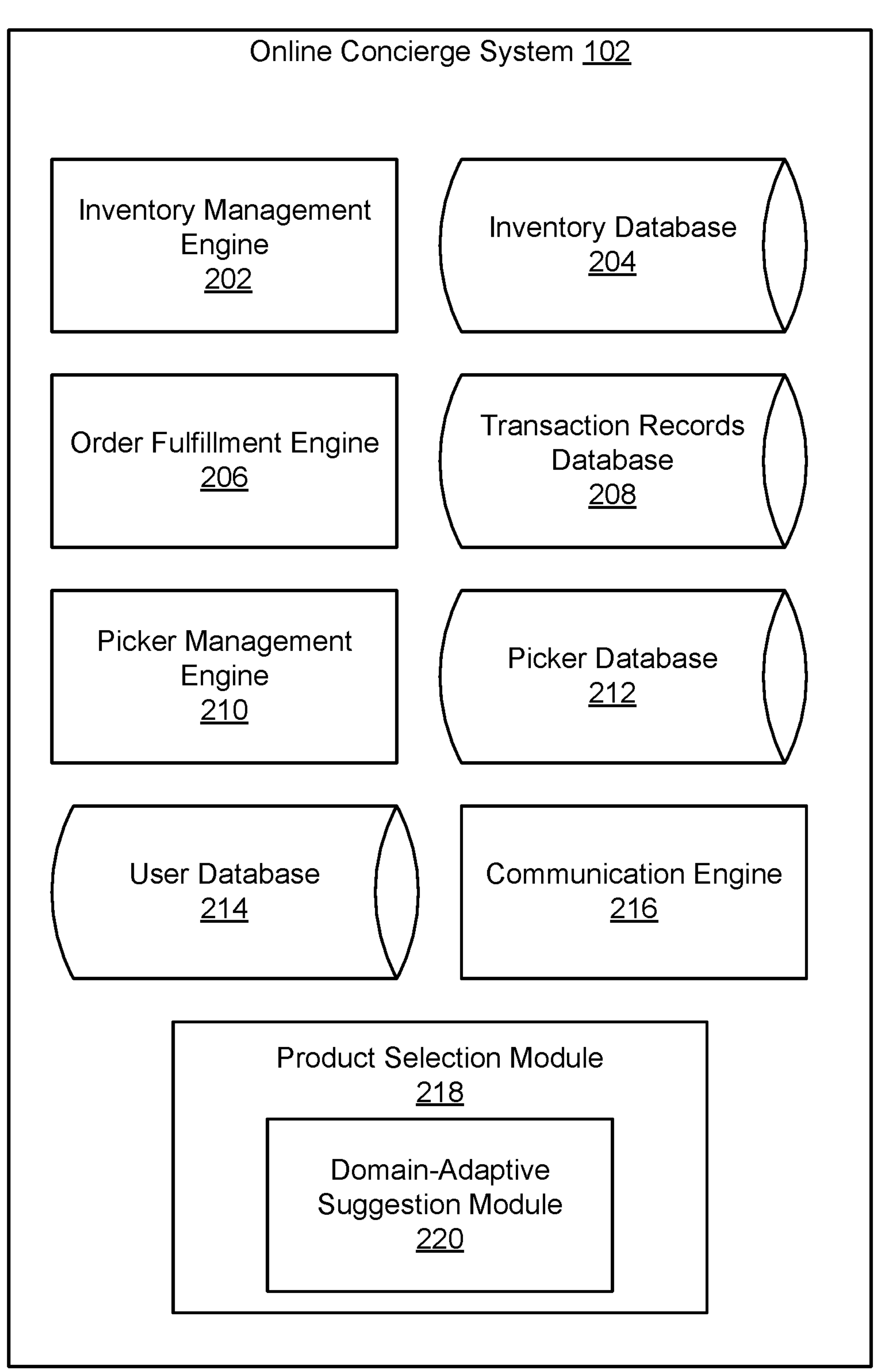
FIG. 2 is a block diagram of an online concierge system, in accordance with some embodiments.

FIG. 2 is a block diagram of an online concierge system 102, according to some embodiments. The online concierge system illustrated in FIG. 2 includes an inventory management engine 202, an inventory database 204, an order fulfillment engine 206, a transaction records database 208, a picker management engine 210, a picker database 212, a user database 214, a communications engine 216, a product selection module 218, and a domain-adaptive suggestion module 220. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The online concierge system 102 includes an inventory management engine 202, which interacts with inventory systems associated with each retailer 110. In some embodiments, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and quantitative information about items, including size, color, weight, SKU, serial number, and so on. In some embodiments, the inventory database 204 also stores purchasing rules associated with each item, if they exist. For example, age-restricted items such as alcohol and tobacco are flagged accordingly in the inventory database 204.

In some embodiments, the inventory database 204 stores product embeddings for products offered for sale on the online concierge system 102. A product embedding is an embedding that describes a product. The product embeddings may be associated with specific products stored by the inventory database 204. For example, each brand of a product may have an individual product embedding, or products may have different product embeddings for each retailer that sells the product. Alternatively, each product embedding may be associated with a generic product, and each generic product is associated with specific products that are similar or substitutes of each other. For example, the inventory database 102 may store a product embedding for the generic product "milk", and the specific products of "Moo Moo 2% Milk" and "Greener Pastures Organic Whole Milk" may both be associated with the product embedding for "milk."

The online concierge system 102 also includes an order fulfillment engine 206 which is configured to synthesize and display an ordering interface to each user 104 (for example, via the user mobile application 106). The order fulfillment engine 206 is also configured to access the inventory database 204 in order to determine which products are available at which retailers 110. The order fulfillment engine 206 determines a sale price for each item ordered by a user 104. Prices set by the order fulfillment engine 206 may or may not be identical to in-store prices determined by retailers (which is the price that users 104 and pickers 108 would pay at retailers). The order fulfillment engine 206 also facilitates transactions associated with each order. In some embodiments, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and user 104 associated with the transaction. In some embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In some embodiments, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the user 104), his/her familiarity level with that particular retailer 110, and so on. Additionally, the picker management engine 210 accesses a picker database 212 which stores information describing each picker 108, such as his/her name, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a user database 214 which stores information describing each user. This information could include each user's name, address, gender, shopping preferences, favorite items, stored payment instruments, and so on.

The online concierge system 102 may use a communication engine 216 that transmits information between the user mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a user in transit, issues with items in an order, and the like. The communication engine 216 determines a message or notification to send to a user 104, picker 108, or runner 114 based on this information and transmits the notifications to the appropriate application. For example, the online concierge system 102 may receive information from the user mobile application 106 indicating that a user 104 is traveling to the pickup location to retrieve an order. Based on this information, the communication engine 216 sends a notification to the runner mobile application 116 indicating that the user 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the user mobile application 106 associated with the order.

The product selection module 218 selects products to be presented to the user. The product selection module 218 selects products to present to the user based on a relevance or affinity of the products to the user. The product selection module 218 may determine the relevance of a product to a user based on a machine-learning model (e.g., a neural network) that has been trained to determine the relevance of products to users. The product selection module 218 may determine the relevance of a product to a user based on information about the user, the type of product, whether the user has ordered the product before (and if so, how recently), whether the product is related to other products the user has ordered or the relevance of the product to a search query provided by the user. The product selection module 218 may present the selected products to the user as search results, a feed of potentially relevant products, or as part of an ordered list of all products available to the user.

In some embodiments, the product selection module 218 selects products to present to the user in response to a search query by the user. A search query is a string of text that represents a user's interest in being presented with a set of products related to that text. For example, if the user provides a search query of "ground beef," the user is likely interested in all types of ground beef products available for purchase via the online concierge system. Accordingly, the product selection module 218 may present ground beef products to the user in response to the user's search query.

In some embodiments, the product selection module 218 presents products to the user in one of two ways. Firstly, the product selection module 218 may present products to the user as search results. Products presented as search results are products that the product selection module 218 determines are directly related to the user's search query. Using the "ground beef" example above, products presented as search results may include "organic ground beef," "ground chuck," or "ground hamburger." In some embodiments, the product selection module 218 selects products based on search scores associated with the products.

Secondly, the product selection module 218 may present products to users as suggestions. A suggestion is a product that the online concierge system 102 determines may be of general interest to the user. Suggestions may be presented alongside search results in response to a search query by the user. However, a suggestion may be presented with some indication that the suggestion is not a part of the search results, and instead is generally related to the user. Using the "ground beef" example above, products presented as suggestions may include "hamburger buns" or "chili seasonings" if the user typically searches for products related to hamburgers or chili respectively. In some embodiments, the suggestions are sponsored suggestions where a sponsor has paid the online concierge system 102 to suggest their product in the ordering interface 302. In some embodiments, the products election module selects products based on suggestion scores associated with the products.

The product selection module 218 uses a domain-adaptive suggestion module 220 to score products to be presented as suggestions to a user. The domain-adaptive suggestion module 220 uses one or more machine-learning models that are trained to score products. These machine-learning models are trained based on search examples and suggestion examples. To avoid bias that may come from training the domain-adaptive suggestion module to score suggestions based on search examples, the domain-adaptive suggestion module 220 generates domain-neutral representations of the data it uses to score products to use as suggestions. The domain-adaptive suggestion module 220 is discussed in further detail below in the context of FIG. 4.

Figure 3A:
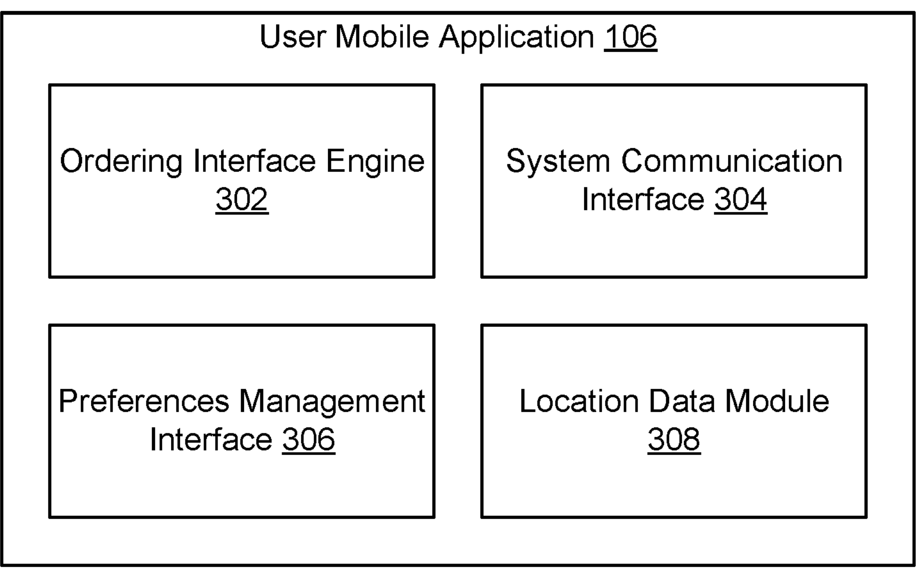
FIG. 3A is a block diagram of the user mobile application (UMA), in accordance with some embodiments.

FIG. 3A is a block diagram of the user mobile application (UMA) 106, according to some embodiments. The UMA 106 illustrated in FIG. 3A includes an ordering interface engine 302, a system communication interface 304, a preferences management interface 306, and a location data module 308. Alternative embodiments may include more, fewer, or different components from those illustrated in FIG. 3A, and the functionality of each component may be divided between the components differently from the description below. Additionally, each component may perform their respective functionalities in response to a request from a human, or automatically without human intervention.

The user 104 accesses the UMA 106 via a client device, such as a mobile phone, tablet, laptop, or desktop computer. The UMA 106 may be accessed through an app running on the client device or through a web site accessed in a browser. The UMA 106 includes an ordering interface 302, which provides an interactive interface with which the user 104 can browse through and select products and place an order. The ordering interface 302 also may include a selected products list that specifies the amounts and prices of products that the user 104 has selected to order. The user 104 may review the selected products list and place an order based on the selected products list. Furthermore, the ordering interface 302 may present recipes to the user 104 that the online concierge system 102 predicts the user 104 is attempting to complete, and may provide an option to the user 104 to add additional products needed to complete a recipe to the user's selected products list.

The ordering interface 302 may allow a user to search for products offered for sale on the online concierge system 102. For example, the ordering interface 302 may include elements that the user may use to enter a search query. Once the user enters a search query, the ordering interface 302 may present to the user a set of search results that the online concierge system 102 determines are relevant to the user's search. The ordering interface 302 may also include elements that allow the user to order products that are presented as part of the set of search results.

The ordering interface 302 may also present suggestions to users of products that the online concierge system 102 predicts the user may want to order. For example, if the online concierge system 102 determines that the user is likely searching for products for making hamburgers, the ordering interface 302 may present suggested products like ground beef, hamburger buns, cheese, or ketchup to the user. These suggestions may be presented to the user alongside search results, or may be presented on their own.

Figure 5:
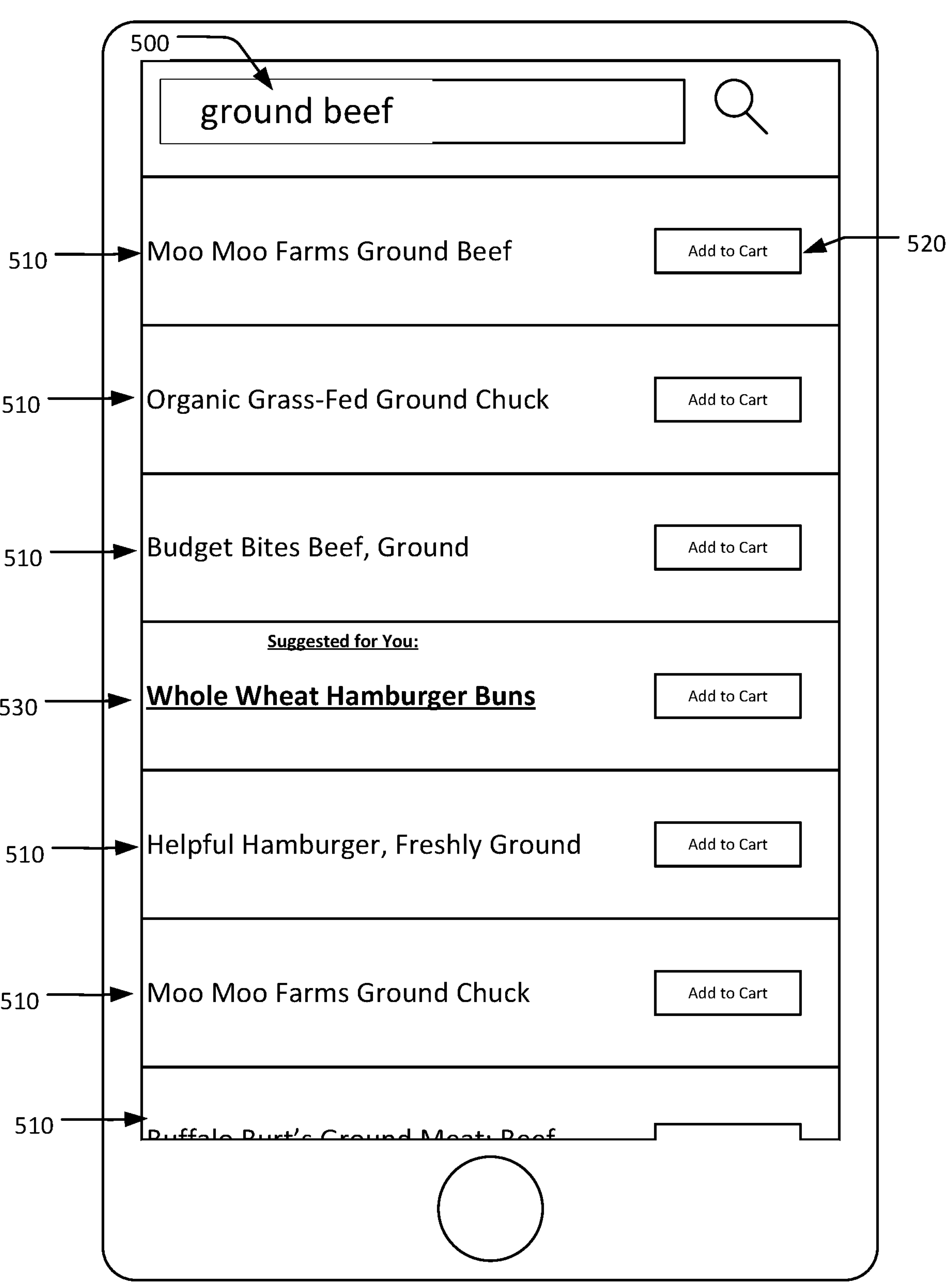
FIG. 5 illustrates an example user interface with search results and suggestions, in accordance with some embodiments.

In some embodiments, the ordering interface 302 may present search results and suggestions in accordance with the example user interface illustrated in FIG. 5. FIG. 5 illustrates an example user interface with search results and suggestions, in accordance with some embodiments. Alternative user interfaces may include more, fewer, or different elements or the elements may be displayed or arranged in a different way. Additionally, other user interfaces may be displayed on different devices from that illustrated in FIG. 5.

In the example user interface illustrated by FIG. 5, the user has input a search query 500 of "ground beef." The online concierge system 102 displays search results 510 that relate to the user's search query 500. The search results may be displayed with an option 520 to add the search result to the selected products list. Additionally, online concierge system 102 has displayed a suggestion 530 to the user as well. The suggestion 530 has been selected based on the search query 500, but may not be as tied to the search query 500 as the search results 510.

Users 104 may also use the ordering interface 302 to message with pickers 108 and runners 114 and receive notifications regarding the status of their orders. The UMA 106 also includes a system communication interface 304 which, among other functions, receives inventory information from the online concierge system 102 and transmits order and location information to the online concierge system 102. The UMA 106 also includes a preferences management interface 306 which allows the user 104 to manage basic information associated with his/her account, such as his/her home address and payment instruments. The preferences management interface 306 may also allow the user to manage other details such as his/her favorite or preferred retailers 110, preferred handoff times, special instructions for handoff, and so on.

The UMA 106 also includes a location data module 308. The location data module 308 may access and store location data related to a client device associated with a user 104 via the user mobile application 106. Location data may include the geographic location of the client device associated with the user mobile application 106, how fast the client device is travelling, the average speed of the client device when in transit, the direction of travel of the client device, the route the user 104 is taking to a pickup location, current traffic data near the pickup location, and the like. For simplicity, the location of a user client device or client device may be referred to as the location of the user throughout this description. The user 104 may specify whether or not to share this location data with the user mobile application 106 via the preferences management interface 306. If a user 104 does not allow the user mobile application 106 to access their location data, the location data module 308 may not access any location data for the user 104. In some embodiments, the user 104 may specify certain scenarios when the location data module 308 may receive location data, such as when the user 104 is using the user mobile application 106, any time, or when the user 104 turns on location tracking in the user mobile application 106 via an icon. The user 104 may also specify which location data the location data module 308 may retrieve, and which location data is off-limits. In some embodiments, the location data module 308 may be tracking the user's 104 location as a background process while the UMA 106 is in use. In other embodiments, the UMA 106 may use real-time location data from the location data module 308 to display a map to the user 104 indicating their current location and the route to a pickup location for their order.

Figure 3B:
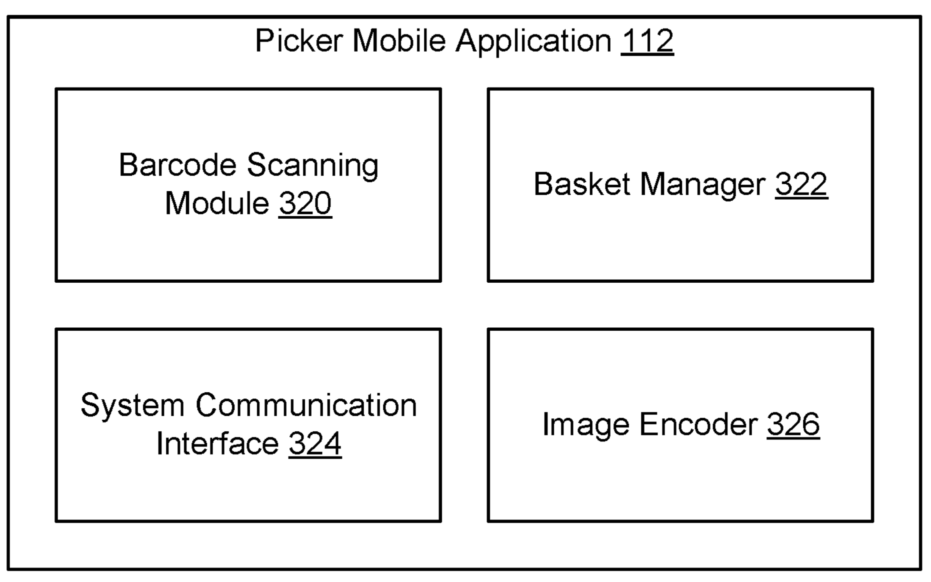
FIG. 3B is a block diagram of the picker mobile application (PMA), in accordance with some embodiments.

FIG. 3B is a block diagram of the picker mobile application (PMA) 112, according to some embodiments. The PMA 112 illustrated in FIG. 3B includes a barcode scanning module 320, a basket manager 322, a system communication interface 324, and an image encoder 326. Alternative embodiments may include more, fewer, or different components from those illustrated in FIG. 3B, and the functionality of each component may be divided between the components differently from the description below. Additionally, each component may perform their respective functionalities in response to a request from a human, or automatically without human intervention.

The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In some embodiments, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a user updates an order to include more or less items. The system communication interface may receive notifications and messages from the online concierge system 102 indicating information about an order. The system communication interface transmits notifications and messages to be displayed via a user interface of the mobile device associated with the PMA 112.

Figure 3C:
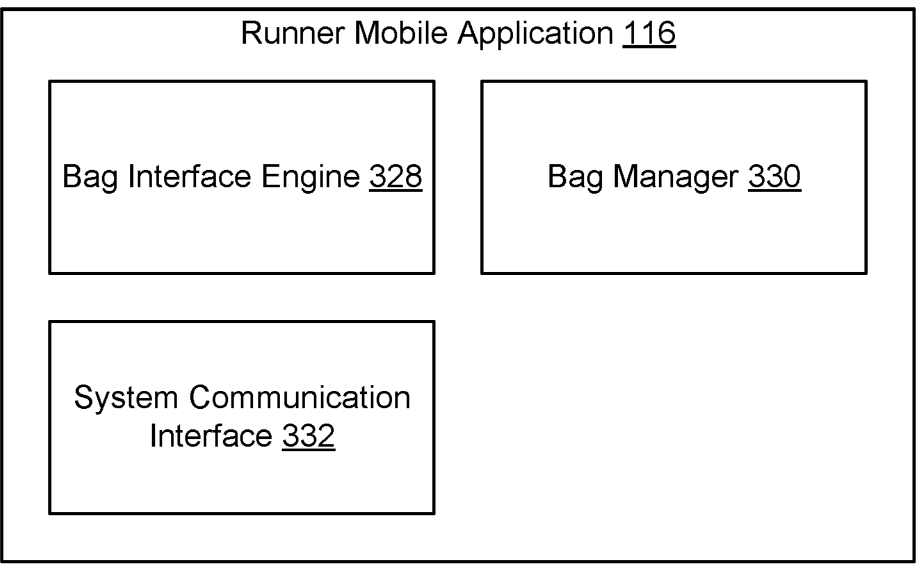
FIG. 3C is a block diagram of the runner mobile application (RMA), in accordance with some embodiments.

FIG. 3C is a block diagram of the runner mobile application (RMA) 116, according to some embodiments. The RMA 116 illustrated in FIG. 3C includes a bag interface engine 328, a bag manager 330, and a system communication interface 332. Alternative embodiments may include more, fewer, or different components from those illustrated in FIG. 3C, and the functionality of each component may be divided between the components differently from the description below. Additionally, each component may perform their respective functionalities in response to a request from a human, or automatically without human intervention.

The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a user 104 who is in transit to a pickup location, and new orders to deliver. The runner 114 may also receive communications via the bag interface engine 328 with users regarding order handoff and pickup confirmation and may interact with the interface generated by the bag interface engine 328 to send communications to users and the online concierge system 102 regarding order status. For example, a runner 114 may send the user a pickup spot at the pickup location to meet for order handoff and indicate that an order has been delivered to a user via the interface, which ends the wait time calculation by the location data module 308 associated with the user.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile device associated with the RMA 116.

Example Domain-Adaptive Suggestion Module

Figure 4:
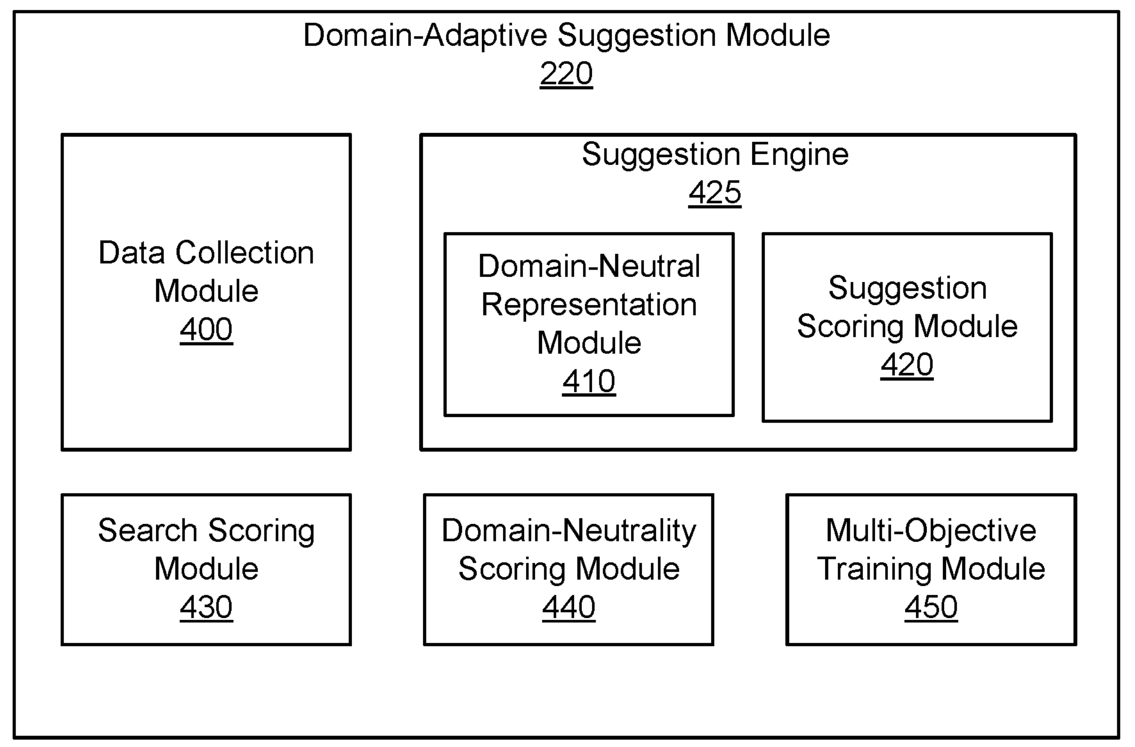
FIG. 4 is a block diagram illustrating an example structure of a domain-adaptive suggestion module, in accordance with some embodiments.

FIG. 4 is a block diagram illustrating an example structure of a domain-adaptive suggestion module 220, in accordance with some embodiments. The illustrated domain-adaptive suggestion module 220 includes a data collection module 400, a domain-neutral representation module 410, a suggestion scoring module 420, a suggestion engine 425, a search scoring module 430, a domain-neutrality scoring module 440, and a multi-objective training module 450. Alternative embodiments may include more, fewer, or different components from those illustrated in FIG. 4, and the functionality of each component may be divided between the components differently from the description below. Additionally, each component may perform their respective functionalities in response to a request from a human, or automatically without human intervention.

The data collection module 400 collects data used by the domain-adaptive suggestion module 220 to score products to present to a user as suggestions. The data collection module 400 may collect data from the UMA 106, the PMA 112, the RMA 116, the inventory database 204, the transaction records database 208, the picker database 212, or the user database 214.

The data collection module 400 may collect user data about a user for whom the domain-adaptive suggestion module 220 scores products to present. User data is data that describes characteristics about a user that may be relevant for determining the relevance of a product to a user. For example, user data may include one or more of the user's name, the user's location, the user's stated preferences, the user's previously ordered products, the user's frequency of placing orders, which retailers the user orders from, a typical order cost for the user, or a browsing history of the user on the UMA 106 or other applications the user may use. In some embodiments, the data collection module 400 collects user data from the user database 214.

The data collection module 400 may collect product data for products the domain-adaptive suggestion module 220 evaluates for possible presentation to the user, e.g., as a search result or as a suggestion. Product data is data that describes characteristics about products available for purchase using the online concierge system 102. For example, product data may include one or more of a product name, a product type, whether a product is associated with a recipe, retailers that offer the product for sale, the shelf-life of a product, identifiers for other products with which the product is commonly purchased, a popularity of the product, the availability of a product, the price of a product, any restrictions that may be in place on the purchase of the product, whether the product is a food item, a frequency with which the product is purchased using the online concierge system 102, other products with which the product has been or may be presented, or an expense incurred by the online concierge system 102 to provide the product to the user. In some embodiments, the data collection module 400 collects product data from the inventory database 204.

In some embodiments, the data collection module 400 collects search query data. Search query data is data describing a user's search query for the online concierge system 102. For example, search query data may include one or more of search query text, previous searches by the user within the user's session, or search queries conducted by other users of the online concierge system 102. Search query data may also include context data describing the context in which the user has queried the online concierge system 102 for products. For example, the context data may include one or more of how long the user's session with the online concierge system 102 has lasted, the products that are currently in the user's selected products list, or other products with which the user has interacted during the session.

The data collection module 400 also collects training data that is used to train machine-learning models used by the domain-adaptive suggestion module 220. The training data includes a set of training examples that represent instances where a product was presented to the user by the online concierge system 102 in response to a search query. The training examples include user data associated with the user to whom the product was presented, product data describing the product that was presented, and search query data describing the search query in response to which the product was presented. In some embodiments, training examples include feature sets describing one or more of user data, search query data, or product data.

Each training example may also be labeled with whether the user interacted with the product when the product was presented as a result to the user. The labels on training examples may simply indicate whether the user interacted with the product in any way or may indicate what kind of interaction, if any, the user had with the product. In some embodiments, the labels indicate a hierarchy of interactions that the user may have with a product. This interaction hierarchy may specify that certain interactions are clearer signals of the relevance of a product to a user when it was presented to the user. For example, the interaction hierarchy may rank a purchase interaction (i.e., where the user purchases the product) above a selection interaction (i.e., where the user adds the product to the selected products list), which may be ranked above a click interaction (i.e., where the user selects the product to view more details about the product).

In some embodiments, the training examples include search examples and suggestion examples. Search examples are training examples that come from the search domain, meaning the search examples are training examples where the product was presented to the user as a part of search results in response to a search query. Suggestion examples are training examples that come from the suggestion domain, meaning the suggestion examples are training examples where the product was presented to the user as a suggestion.

The domain-neutral representation module 410 generates domain-neutral representations. A domain-neutral representation is a featurized representation of the data received by the domain-neutral representation module 410 that can be used effectively by machine-learning models in the search domain and in the suggestion domain. The domain-neutral representation module 410 generates domain-neutral representations based on data collected by the data collection module 400. For example, the domain-neutral representation module 410 may generate the domain-neutral representations based on user data, product data, or search query data. In some embodiments, a domain-neutral representation includes a feature vector or an embedding in a latent space.

The domain-neutral representation module 410 generates a domain-neutral representation using one or more domain-neutral representation models. A domain-neutral representation model is a machine-learning model (e.g., a neural network) that is trained to generate domain-neutral representations. The domain-neutral representation models may be trained based on search examples and suggestion examples. However, the domain-neutral representation models have been trained such that the domain-neutral representations are domain-neutral, meaning that suggestion models used by the suggestion scoring module 420 can be trained using search examples, but without introducing bias due to using training examples from a different domain. How the domain-neutral representation module 410 is trained to generate domain-neutral representations is discussed in further detail in the context of FIGS. 6A and 6B.

The suggestion scoring module 420 generates suggestion scores for products for possible presentation to a user as a suggestion to include with search results. A suggestion score is a score that represents a product's affinity for being presented as a suggestion in response to a search query from a user. The suggestion scoring module 420 generates suggestion scores for products based on domain-neutral representations generated by the domain-neutral representation module 410. For example, the domain-neutral representation module 410 generates a domain-neutral representation for a product to be presented to a user in response to a search query. The suggestion scoring module 420 then scores the product based on the domain-neutral representation. In some embodiments, if a product has been sponsored by a sponsor to be suggested to a user, the suggestion scoring module 420 may adjust a score for a product based on an amount of consideration paid by the sponsor to the online concierge system 102.

The suggestion scoring module 420 may use one or more suggestion models to score products. A suggestion model is a machine-learning model (e.g., a neural network) that is trained to score products based on domain-neutral representations. These suggestion models may be trained based on suggestion examples. In some embodiments, to train the suggestion models based on a suggestion example, the suggestion scoring module 420 applies a suggestion relevance loss function that compares suggestion score generated by the suggestion scoring module 420 with a label assigned to the suggestion example. The suggestion scoring module 420 may then update weights stored by the suggestion models based on the suggestion relevance loss function. The suggestion scoring module 420 may use a ranking loss function or a log loss function as a suggestion relevance loss function. How the suggestion scoring module 420 is trained is discussed in further detail in the context of FIGS. 6A and 6B.

The domain-neutral representation module 410 and the suggestion scoring module 420 may be part of a suggestion engine 425 that generates suggestion scores based on data collected by the data collection module 400. In some embodiments, the suggestion engine 425 includes the search scoring module 430 and the suggestion engine 425 also generates search scores based on data collected by the data collection module 400.

The search scoring module 430 generates search scores for products for possible presentation to a user as a search result. A search score is a score that represents a product's affinity for being presented as a search result in response to a search query from a user. The search scoring module 430 generates search scores for products based on domain-neutral representations generated by the domain-neutral representation module 410. For example, the domain-neutral representation module 410 generates a domain-neutral representation for a product to be presented to a user in response to a search query. The search scoring module 430 then scores the product based on the domain-neutral representation.

The search scoring module 430 may use one or more search models to score products. A search model is a machine-learning model (e.g., a neural network) that is trained to score products based on domain-neutral representations. These search models may be trained based on search examples. In some embodiments, to train the search models based on a search example, the search scoring module 430 applies a search loss function that compares the search score with a label assigned to the search example. The search scoring module 430 may then update weights stored by the search models used by the search scoring module 430 based on the search loss function. The search scoring module 430 may use a ranking loss function as a search loss function.

In some embodiments, the search scoring module 430 is used by the product selection module 218 to select products to present to a user as search results. Alternatively, the search scoring module 430 may simply be used by the domain-adaptive suggestion module 220 in the training of the domain-neutral representation module 410. In some embodiments, the search scoring module 430 does not update the one or more search models that it uses to score products during the training of the domain-adaptive suggestion module 220. How the search scoring module 430 is used in the training of the domain-adaptive suggestion module 220 is discussed in further detail in the context of FIGS. 6A and 6B.

The domain-neutrality scoring module 440 generates domain-neutrality scores for domain-neutral representations generated based on training examples. A domain-neutrality score is a score of how domain-neutral a domain-neutral representation is. The domain-neutrality score indicates that a domain-neutral representation is less domain-neutral when the domain-neutrality scoring module 440 can determine whether the domain-neutral representation was generated based on a search example or a suggestion example. Similarly, the domain-neutrality score indicates that a domain-neutral representation is more domain-neutral when the domain-neutrality scoring module 440 cannot determine whether the domain-neutral representation was generated based on a search example or a suggestion example. In some embodiments, the domain-neutrality scoring module 440 is only applied to training examples, and is not used when the domain-adaptive suggestion module 220 is applied to select new suggestions to present to a user.

The domain-neutrality scoring module 440 may apply a neural network, such as a discriminator network, to generate domain-neutrality scores for domain-neutral representations. The domain-neutrality scoring module 440 also may generate domain-neutrality scores based on a difference between distributions representing search examples and suggestion examples (e.g., using optimal transport, Jensen-Shannon divergence, or Wasserstein distance). How the domain-neutrality scoring module 440 is used in the training of the domain-adaptive suggestion module 220 is discussed further below.

The multi-objective training module 450 trains the domain-neutral representation module 410 to generate domain-neutral representations. The multi-objective training module 450 balances training the domain-neutral representation module 410 to be domain adaptive with training the domain-neutral representation module 410 to generate domain-neutral representations that are useful for the scoring of both search results and suggestions. The multi-objective training module 450 trains the domain-neutral representation module 410 based on three loss functions. For example, the multi-objective training module 460 may train the domain-adaptive representation module 410 based on (1) a suggestion relevance loss function used to train suggestion models; (2) a search loss function used to train search models; and (3) a domain-adaptive loss function based off of domain-neutrality scores generated by the domain-neutrality scoring module 440. The multi-objective training module 450 may train the domain-neutral representation module 410 using a multi-objective loss function that assigns weights to one or more of the three loss functions. The weights may be assigned such that domain-neutral representations generated by the domain-neutral representation module 410 are domain-neutral while including useful information to be used by suggestion models or search models. The multi-objective training module 450 may apply one or more of the loss functions to the domain-neutral representation module 410 one-at-a-time, updating weights stored by the domain-neutral representation module 410 with each loss function. How the multi-objecting training module 460 is used in training the domain-adaptive suggestion module 220 is discussed in further detail below.

Exemplary Training a Domain-Adaptive Suggestion Module

Figure 6A:
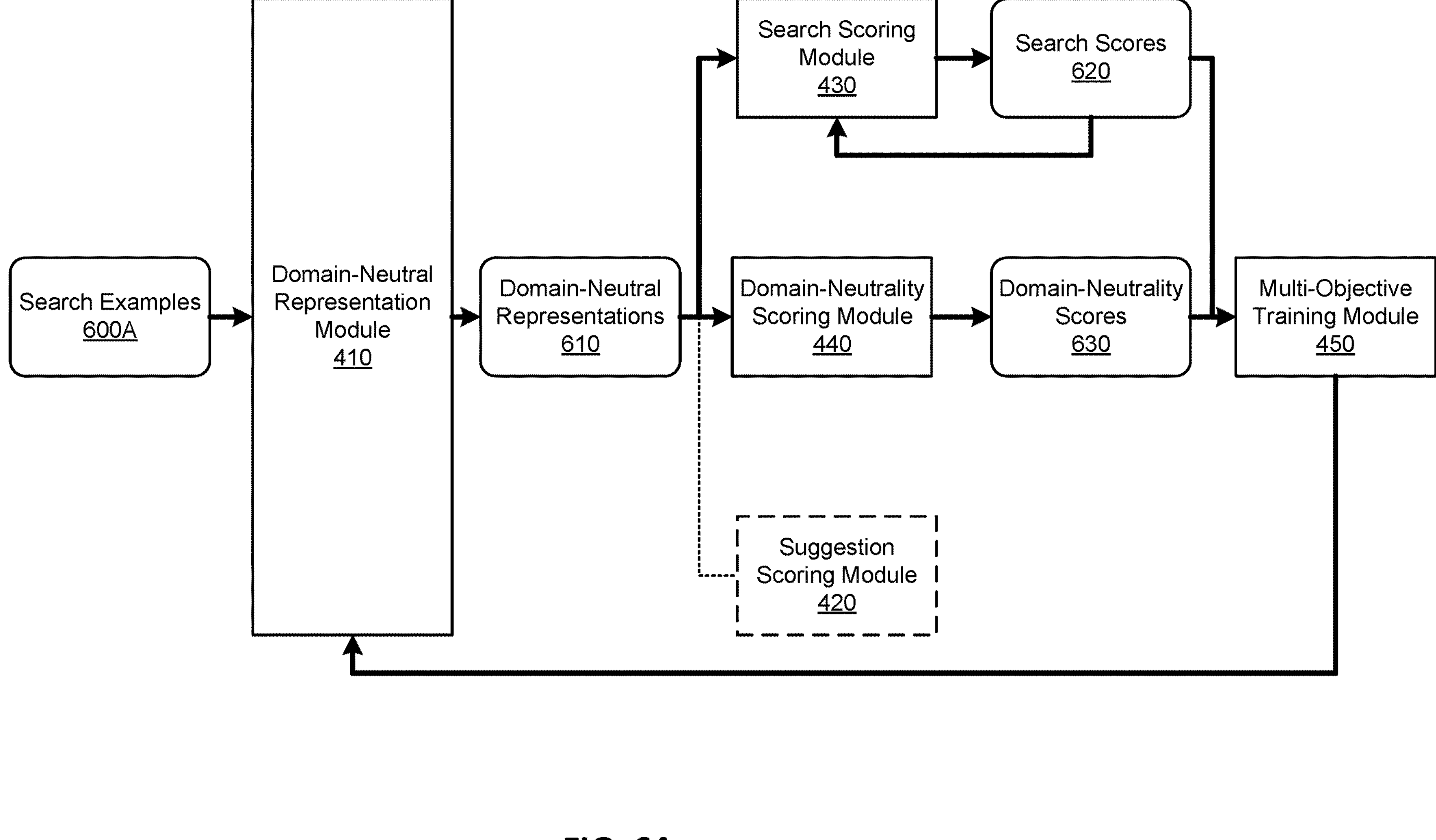
FIG. 6A illustrates an example data flow through a domain-adaptive suggestion module while training the domain-adaptive suggestion module using a search example, in accordance with some embodiments.
Figure 6B:
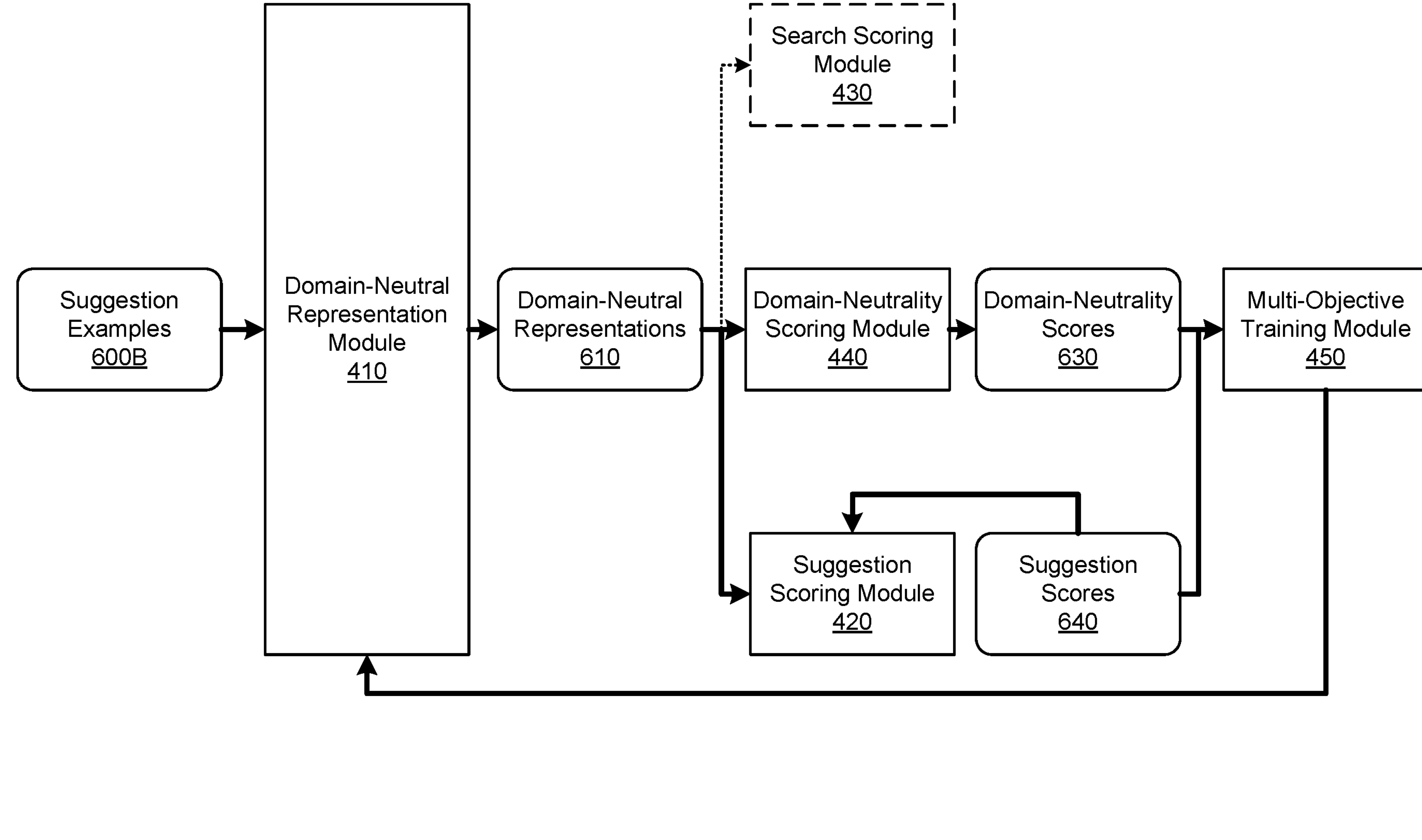
FIG. 6B illustrates an example data flow through a domain-adaptive suggestion module while training the domain-adaptive suggestion module using a suggestion example, in accordance with some embodiments.

FIGS. 6A and 6B illustrate an example data flow through a domain-adaptive suggestion module 220 while training the domain-adaptive suggestion module 220, in accordance with some embodiments. Alternative embodiments may include more, fewer, or different components from those illustrated in FIGS. 6A and 6B, and the functionality of each component may be divided between the components differently from the description below. Additionally, each component may perform their respective functionalities in response to a request from a human, or automatically without human intervention.

FIG. 6A illustrates an example data flow through a domain-adaptive suggestion module 220 while training the domain-adaptive suggestion module 220 using search examples 600A, in accordance with some embodiments. The domain-adaptive suggestion module 220 receives a set of search examples 600A. The domain-neutral representation module 410 generates a domain-neutral representation 610 for each search example in the set of the search examples 600A and passes the domain-neutral representations 610 for the search examples 600A to the search scoring module 430 and the domain-neutrality scoring module 440. The search scoring module 430 generates a search score 620 for each search example of the set of search examples 600A based on the domain-neutral representation 610 corresponding to each search example, and the domain-neutrality scoring module 440 generates a domain-neutrality score 630 for each domain-neutral representation 610.

The multi-objective training module 450 trains the one or more domain-neutral representation models used by the domain-neutral representation module 410 based on the search scores 620 and the domain-neutrality scores 630. In some embodiments, to train the domain-neutral representation module 410, the multi-objective training module 450 applies a multi-objective loss functions that balances a search loss function and a domain-adaptive loss function. The search loss function evaluates each of the search scores 620 by comparing each search score 620 with the label assigned to the corresponding search example 600A. The domain-adaptive loss function is a loss function that uses the domain-neutrality scores 630 to score how domain-neutral the domain-neutral representations 610 are. The multi-objective loss function may assign a weight to the output of the search loss function and the domain-adaptive loss function to balance how impactful each loss function is in training the domain-neutral representation module 410.

In some embodiments, the multi-objective training module 450 trains the domain-neutral representation module 410 using multiple backpropagation passes. For example, the multi-objective training module 450 may first backpropagate through the domain-neutral representation module 410 with the search loss function, and then with the domain-adaptive loss function (or vice versa).

In some embodiments, the search scoring module 430 trains itself based on the search scores 620. In these embodiments, the search scoring module 430 may be used by the product selection module 218 to score products for presentation to a user as search results. Alternatively, the search scoring module 430 may simply be used by the domain-adaptive suggestion module 220 to aid in the training of the domain-neutral representation module 410.

In some embodiments, when training the domain-adaptive suggestion module 220 based on a search example, the domain-adaptive suggestion module 220 does not train the suggestion scoring module 420 based on the search examples 600A.

FIG. 6B illustrates an example data flow through a domain-adaptive suggestion module 220 while training the domain-adaptive suggestion module 220 using a suggestion example 600B, in accordance with some embodiments. The domain-adaptive suggestion module 220 receives a set of suggestion examples 600B. The domain-neutral representation module 410 generates a domain-neutral representation 610 for each suggestion example in the set of suggestion examples 600B and passes the domain-neutral representation 610 for the suggestion examples 600B to the suggestion scoring module 420 and the domain-neutrality scoring module 440. The suggestion scoring module 420 generates a suggestion score 640 for each of the suggestion examples 600B based on the domain-neutral representation 610 corresponding to each suggestion example, and the domain-neutrality scoring module 440 generates a domain-neutrality score 630 for each domain-neutral representation 610.

The suggestion scoring module 420 trains itself based on the suggestion scores 640 using a suggestion relevance loss function. Additionally, the multi-objective training module 450 trains the one or more domain-neutral representation models used by the domain-neutral representation module 410 based on the suggestion scores 640 and the domain-neutrality scores 630. In some embodiments, to train the domain-neutral representation module 410, the multi-objective training module 450 applies a multi-objective loss functions that balances a suggestion relevance loss function and a domain-adaptive loss function. The suggestion relevance loss function evaluates the suggestion scores 640 by comparing each suggestion score 640 with the label assigned to the corresponding suggestion example 600B. In some embodiments, the suggestion relevance loss function is the same loss function as one used to train the suggestion scoring module 420. The domain-adaptive loss function is a loss function that uses the domain-neutrality score 630 to score how domain-neutral the domain-neutral representations 610 are. The multi-objective loss function may assign a weight to the output of the suggestion relevance loss function and the domain-adaptive loss function to balance how impactful each loss function is in training the domain-neutral representation module 410.

In some embodiments, the multi-objective training module 450 trains the domain-neutral representation module 410 using multiple backpropagation passes. For example, the multi-objective training module 450 may first backpropagate through the domain-neutral representation module 410 with the suggestion relevance loss function, and then with the domain-adaptive loss function (or vice versa).

In some embodiments, when training the domain-adaptive suggestion module 220 based on a suggestion example, the domain-adaptive suggestion module 220 does not train the search scoring module 430 based on the suggestion examples 600B.

Scoring Suggestions Using Example Domain-Adaptive Suggestion Module

Figure 7:
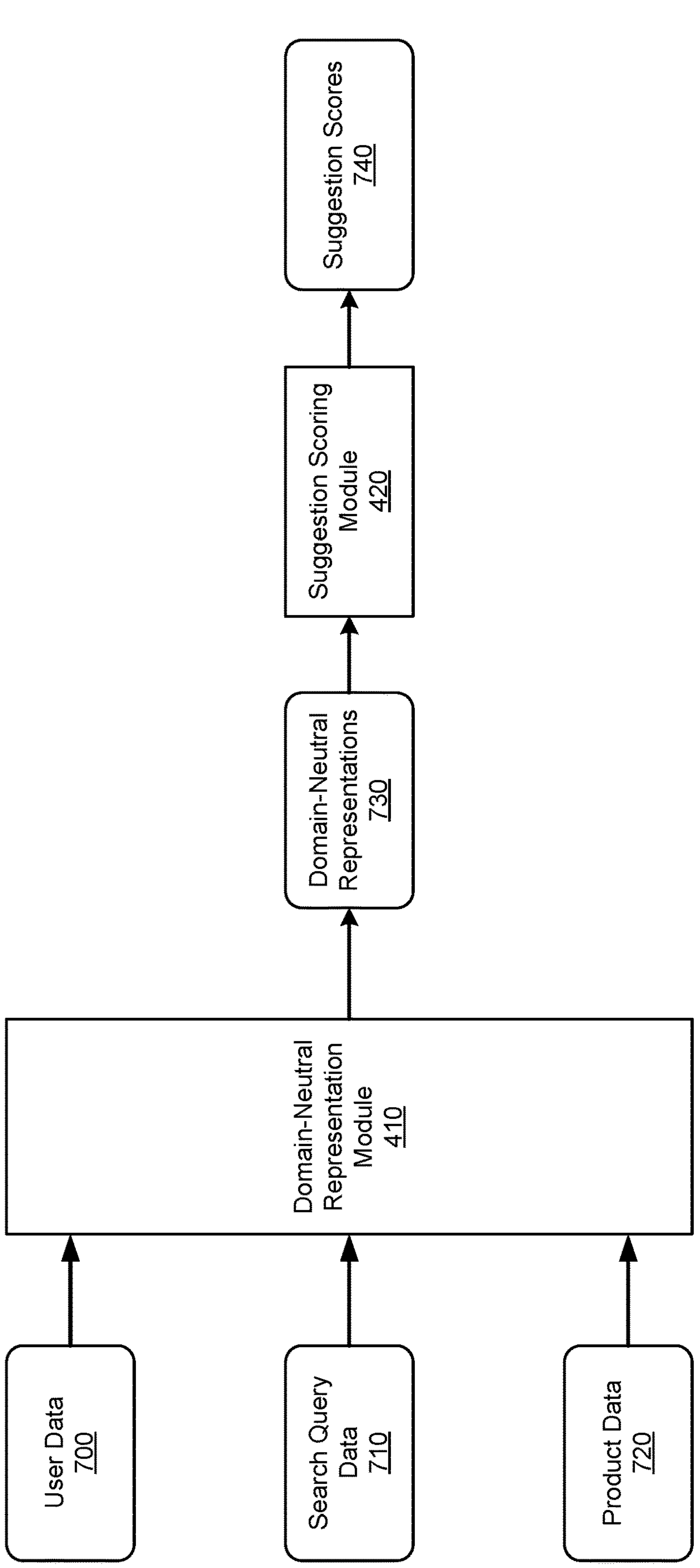
FIG. 7 illustrates an example data flow through a domain-adaptive suggestion module when scoring suggestions to present to a user, in accordance with some embodiments.

FIG. 7 illustrates an example data flow through a domain-adaptive suggestion module 220 when scoring suggestions to present to a user, in accordance with some embodiments. Alternative embodiments may include more, fewer, or different components from those illustrated in FIG. 7, and the functionality of each component may be divided between the components differently from the description below. Additionally, each component may perform their respective functionalities in response to a request from a human, or automatically without human intervention.

To score suggestions to present to a user in response to a search query, the domain-adaptive suggestion module 220 receives user data 700, search query data 710, and product data 720. The user data 700 describes the user who submitted the search query to the online concierge system 102. The search query data 710 describes the search query provided by the user. The search query data 710 also may include context data describing the session within which the user submits the search query to the online concierge system 102. The product data 720 describes a set of products to be evaluated for possible presentation to the user in response to the user's search query.

The domain-neutral representation module 410 generates domain-neutral representations 730 based on the received user data 700, search query data 710, and product data 720. In some embodiments, the domain-neutral representation module 410 generates a domain-neutral representation 730 for each product in the set of products in the product data 720. The domain-neutral representation module 410 may generate a domain-neutral representation 730 based on triplets that comprise the user data 700, the search query data 710, and the product data 720. The domain-neutral representation module 410 also may generate a domain-neutral representation 730 based on all of the products in the set of products.

The suggestion scoring module 420 generates a suggestion score 740 for each product in the set of products based on the domain-neutral representation(s) 730 generated by the domain-neutral representation module 410. The product selection module 218 selects which products to present to the user as suggestions based on the suggestion scores 740. In some embodiments, the search scoring module 430 also generates a search score for each product in the set of products based on the domain-neutral representation(s) 730 generated by the domain-neutral representation module 410. In these embodiments, the product selection module 218 selects a set of products from the product data 720 to present as search results in response to the search query and another set of products to present as the suggestions. In these embodiments, the product selection module 218 selects the search results and the suggestions based on the search scores generated by the search scoring module 430 and the suggestion scores 740 generated by the suggestion scoring module 420.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. A computer-readable medium referred to herein may include one or more media that together store instructions. Additionally, the computers referred to herein may include a single processor or may be architectures employing multiple processor designs.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

As used herein, the terms “comprises,” “comprising,” “includes,” “including,” “has,” “having,” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive “or” and not to an exclusive “or”. For example, a condition A or B is satisfied by any one of the following: A is true (or present) and B is false (or not present), A is false (or not present) and B is true (or present), and both A and B are true (or present).

What is claimed is:

1. A non-transitory computer-readable medium storing (a) a set of parameters for a domain-neutral representation model and a set of parameters for a first-domain scoring model, and (b) a set of computer-executable instructions, wherein the sets of parameters are produced by a process executed by a computing system comprising:

- accessing training data that comprises a plurality of examples, wherein the plurality of examples comprises:
  - a set of first-domain examples, wherein each first-domain example comprises data describing a historical interaction within a first domain, wherein each first-domain example comprises a feature set describing an instance where content of a first format is presented to a user and a label describing whether the user interacted with the content of the first format; and
  - a set of second-domain examples, wherein each first-domain example comprises data describing a historical interaction within a first domain, wherein each second-domain example comprises a feature set describing an instance where content of a second format is presented to a user and a label describing whether the user interacted with the content of the second format;
- generating a domain-neutral representation for each example of the plurality of examples by inputting the feature set of each example to a domain-neutral representation model;
- for each domain-neutral representation corresponding to a first domain example of the set of first domain examples:

generating a first domain score for the first domain example by inputting the domain-neutral representation of the first domain example to a first domain scoring model; and updating parameters of the domain-neutral representation model and the first domain scoring model based on the first domain score and the label of the first domain example;

for each domain-neutral representation corresponding to a second domain example of the set of second domain examples:

generating a second domain score for the second domain example by inputting the domain-neutral representation of the second domain example to a second domain scoring model; and updating the parameters the domain-neutral representation model based on the second domain score and the label of the second domain example;

generating a domain-neutrality score for each domain-neutral representation by inputting the domain-neutral representation into a domain-neutrality scoring model, wherein the domain-neutrality score represents how domain-neutral the domain-neutral representation is;

updating the parameters of the domain-neutral representation model based on a domain-neutrality score; and storing a final set of parameters for the domain-neutral representation model and the first-domain scoring model on the computer-readable medium; and wherein the computer-executable instructions, when executed, cause a computer to perform operations comprising:

receiving a query from a client device associated with a user of an online system;

accessing a set of candidate content of the first format stored by the online system;

generating a domain-neutral representation for each of the set of candidate content of the first format by applying the domain-neutral representation model to the query and the set of candidate content of the first format, wherein generating a domain-neutral representation comprises applying the final set of parameters for the domain-neutral representation model to a feature set for the query and a feature set a candidate content of the first format of the set of candidate content of the first format;

applying the first domain scoring model to each domain-neutral representation to generate a first domain score for each of the set of candidate content of the first format, wherein applying the first domain scoring model to a domain-neutral representation comprises applying the set of parameters for the first domain scoring model to the domain-neutral representation;

ranking the set of candidate content of the first format based on the generated set of first domain scores; and transmitting a subset of the set of candidate content of the first format to the client device for display to the user in response to the query.

2. The non-transitory computer-readable medium of claim 1, wherein each first-domain example in the set of first-domain examples comprises:

a feature set describing a user associated with the first-domain example;

a feature set describing a search query associated with the first-domain example; and a feature set describing a content of a first format associated with the first-domain example.

3. The non-transitory computer-readable medium of claim 1, wherein each second-domain example in the set of search second-domain examples comprises:

a feature set describing a user associated with the second-domain example;

a feature set describing a search query associated with the second-domain example; and a feature set describing a set of products presented as content of a second format associated with the second-domain example.

4. The non-transitory computer-readable medium of claim 1, wherein generating a domain-neutral representation for an example of the plurality of examples comprises:

generating one or more of a feature vector or an embedding.

5. The non-transitory computer-readable medium of claim 1, wherein a first-domain score represents a likelihood of a user to interact with content of a first format based on a product associated with the first-domain score.

6. The non-transitory computer-readable medium of claim 1, wherein a second-domain score represents a likelihood of a user to interact with content of a second format based on a product associated with the second-domain score.

7. The non-transitory computer-readable medium of claim 1, wherein a first-domain score represents an affinity of a product to be presented to a user in response to a search query from the user.

8. The non-transitory computer-readable medium of claim 1, wherein the domain-neutrality scoring model comprises a discriminator network.

9. The non-transitory computer-readable medium of claim 1, wherein generating the domain-neutrality score for a domain-neutral representation comprises:

computing a difference between a distribution representing the set of second-domain examples and a distribution representing the set of first-domain examples.

10. The non-transitory computer-readable medium of claim 1, wherein the process further comprises:

storing a final set of parameters for the first-domain scoring model on the computer-readable medium.

11. A method performed by a computing system comprising:

accessing training data that comprises a plurality of examples, wherein the plurality of examples comprises:

a set of first-domain examples, wherein each first-domain example comprises data describing a historical interaction within a first domain, wherein each first-domain example comprises a feature set describing an instance where content of a first format is presented to a user and a label describing whether the user interacted with the content of the first format; and a set of second-domain examples, wherein each first-domain example comprises data describing a historical interaction within a first domain, wherein each second-domain example comprises a feature set describing an instance where content of a second format is presented to a user and a label describing whether the user interacted with the content of the second format;

generating a domain-neutral representation for each example of the plurality of examples by inputting the feature set of each example to a domain-neutral representation model;

for each domain-neutral representation corresponding to a first domain example of the set of first domain examples:

generating a first domain score for the first domain example by inputting the domain-neutral representation of the first domain example to a first domain scoring model; and updating parameters of the domain-neutral representation model and the first domain scoring model based on the first domain score and the label of the first domain example;

for each domain-neutral representation corresponding to a second domain example of the set of second domain examples:

generating a second domain score for the second domain example by inputting the domain-neutral representation of the second domain example to a second domain scoring model; and updating the parameters the domain-neutral representation model based on the second domain score and the label of the second domain example;

generating a domain-neutrality score for each domain-neutral representation by inputting the domain-neutral representation into a domain-neutrality scoring model, wherein the domain-neutrality score represents how domain-neutral the domain-neutral representation is;

updating the parameters of the domain-neutral representation model based on a domain-neutrality score; and storing a final set of parameters for the domain-neutral representation model and the first-domain scoring model on a computer-readable medium;

receiving a query from a client device associated with a user of an online system;

accessing a set of candidate content of the first format stored by the online system;

generating a domain-neutral representation for each of the set of candidate content of the first format by applying the domain-neutral representation model to the query and the set of candidate content of the first format, wherein generating a domain-neutral representation comprises applying the final set of parameters for the domain-neutral representation model to a feature set for the query and a feature set a candidate content of the first format of the set of candidate content of the first format;

applying the first domain scoring model to each domain-neutral representation to generate a first domain score for each of the set of candidate content of the first format, wherein applying the first domain scoring model to a domain-neutral representation comprises applying the set of parameters for the first domain scoring model to the domain-neutral representation;

ranking the set of candidate content of the first format based on the generated set of first domain scores; and transmitting a subset of the set of candidate content of the first format to the client device for display to the user in response to the query.

12. The method of claim 11, wherein each first-domain example in the set of first-domain examples comprises:

a feature set describing a user associated with the first-domain example;

a feature set describing a search query associated with the first-domain example; and a feature set describing a content of a first format associated with the first-domain example.

13. The method of claim 11, wherein each search example in the set of search second-domain examples comprises:

a feature set describing a user associated with the second-domain example;

a feature set describing a search query associated with the second-domain example; and a feature set describing a set of products presented as content of a second format associated with the second-domain example.

14. The method of claim 11, wherein generating a domain-neutral representation for an example of the plurality of examples comprises:

generating one or more of a feature vector or an embedding.

15. The method of claim 11, wherein a first-domain score represents a likelihood of a user to interact with content of a first format based on a product associated with the first-domain score.

16. The method of claim 11, wherein a second-domain score represents a likelihood of a user to interact with content of a second format based on a product associated with the second-domain score.

17. The method of claim 11, wherein the domain-neutrality scoring model comprises a discriminator network.

18. The method of claim 11, wherein generating the domain-neutrality score for a domain-neutral representation comprises:

computing a difference between a distribution representing the set of second-domain examples and a distribution representing the set of first-domain examples.

19. A non-transitory computer-readable medium storing instructions that, when executed by a processor, cause the processor to perform operations comprising:

accessing training data that comprising a plurality of examples, wherein the plurality of examples comprises:

a set of first-domain examples, wherein each first-domain example comprises data describing a historical interaction within a first domain, wherein each first-domain example comprises a feature set describing an instance where content of a first format is presented to a user and a label describing whether the user interacted with the content of the first format; and a set of second-domain examples, wherein each first-domain example comprises data describing a historical interaction within a first domain, wherein each second-domain example comprises a feature set describing an instance where content of a second format is presented to a user and a label describing whether the user interacted with the content of the second format;

generating a domain-neutral representation for each example of the plurality of examples by inputting the feature set of each example to a domain-neutral representation model;

for each domain-neutral representation corresponding to a first domain example of the set of first domain examples:

generating a first domain score for the first domain example by inputting the domain-neutral representation of the first domain example to a first domain scoring model; and updating parameters of the domain-neutral representation model and the first domain scoring model based on the first domain score and the label of the first domain example;

for each domain-neutral representation corresponding to a second domain example of the set of second domain examples:

generating a second domain score for the second domain example by inputting the domain-neutral representation of the second domain example to a second domain scoring model; and updating the parameters the domain-neutral representation model based on the second domain score and the label of the second domain example;

generating a domain-neutrality score for each domain-neutral representation by inputting the domain-neutral representation into a domain-neutrality scoring model, wherein the domain-neutrality score represents how domain-neutral the domain-neutral representation is;

updating the parameters of the domain-neutral representation model based on a domain-neutrality score; and storing a final set of parameters for the domain-neutral representation model and the first-domain scoring model on the computer-readable medium;

receiving a query from a client device associated with a user of an online system;

accessing a set of candidate content of the first format stored by the online system;

generating a domain-neutral representation for each of the set of candidate content of the first format by applying the domain-neutral representation model to the query and the set of candidate content of the first format, wherein generating a domain-neutral representation comprises applying the final set of parameters for the domain-neutral representation model to a feature set for the query and a feature set a candidate content of the first format of the set of candidate content of the first format;

applying the first domain scoring model to each domain-neutral representation to generate a first domain score for each of the set of candidate content of the first format, wherein applying the first domain scoring model to a domain-neutral representation comprises applying the set of parameters for the first domain scoring model to the domain-neutral representation;

ranking the set of candidate content of the first format based on the generated set of first domain scores; and transmitting a subset of the set of candidate content of the first format to the client device for display to the user in response to the query.

20. The method of claim 11, further comprising:

accessing a set of candidate content of the second format stored by the online system;

generating a domain-neutral representation for each of the set of candidate content of the second format by applying the domain-neutral representation model to the query and the set of candidate content of the second format, wherein generating a domain-neutral representation comprises applying the final set of parameters for the domain-neutral representation model to a feature set for the query and a feature set a candidate content of the second format of the set of candidate content of the second format;

applying the second domain scoring model to each domain-neutral representation to generate a second domain score for each of the set of candidate content of the second format, wherein applying the second domain scoring model to a domain-neutral representation comprises applying the set of parameters for the second domain scoring model to the domain-neutral representation;

ranking the set of candidate content of the second format based on the generated set of second domain scores; and transmitting a subset of the set of candidate content of the second format to the client device for display to the user along with the subset of candidate content of the first format in response to the query.

* * * * *